United States Patent [19]

Hasegawa et al.

[11] Patent Number: 5,682,744
[45] Date of Patent: Nov. 4, 1997

[54] DIRECTIONAL CONTROL VALVE IN A FULL HYDRAULIC TYPE STEERING CONTROL SYSTEM

[75] Inventors: Nobuki Hasegawa; Yukio Sugano, both of Kanagawa, Japan

[73] Assignee: Komatsu Ltd., Japan

[21] Appl. No.: 583,054

[22] PCT Filed: Jul. 25, 1994

[86] PCT No.: PCT/JP94/01223

§ 371 Date: Jan. 19, 1996

§ 102(e) Date: Jan. 19, 1996

[87] PCT Pub. No.: WO95/03505

PCT Pub. Date: Feb. 2, 1995

[30] Foreign Application Priority Data

Jul. 26, 1993 [JP] Japan .................................. 5-40622

[51] Int. Cl.$^6$ .................................................. F16D 31/02
[52] U.S. Cl. ........................ 60/385; 60/469; 137/625.3; 137/625.69
[58] Field of Search ............................. 60/385, 386, 469; 137/625.3, 625.9; 251/282

[56] References Cited

U.S. PATENT DOCUMENTS

| | | | |
|---|---|---|---|
| 3,556,155 | 1/1971 | McWilliams et al. | 137/625.3 |
| 4,161,865 | 7/1979 | Day . | |
| 4,232,584 | 11/1980 | Fassbender | 137/625.69 |
| 4,311,006 | 1/1982 | Becker | 137/625.3 |
| 4,640,094 | 2/1987 | Wittren | 60/385 |

FOREIGN PATENT DOCUMENTS

| | | |
|---|---|---|
| 42 24 469 | 1/1994 | Germany . |
| 51-115329 | 9/1979 | Japan . |
| 61-39551 | 4/1986 | Japan . |
| 3-39670 | 4/1991 | Japan . |
| 3-64741 | 8/1991 | Japan . |
| 2 006 135 | 5/1979 | United Kingdom . |

*Primary Examiner*—F. Daniel Lopez
*Attorney, Agent, or Firm*—Ronald P. Kananen

[57] ABSTRACT

A full hydraulic type steering control system is provided with a steering control valve for outputting a flow of a pressurized discharge fluid of a hydraulic pump in proportion to an amount of steering at a steering wheel, and a directional control valve for delivering the pressurized discharge fluid of the hydraulic pump into a steering control cylinder, with the output flow of pressurized fluid of the steering control valve being switched as a pilot fluid pressure. The directional control valve comprises a spool adapted to be slidably inserted in a spool bore of a valve body. The spool has a neutral position and is adapted to be displaceable from the neutral position towards a first position for delivering the pressurized discharge fluid of the hydraulic pump into a first fluid chamber of the steering control cylinder while permitting a pressurized fluid in a second fluid chamber thereof to flow out into a reservoir and towards a second position for delivering the pressurized discharge fluid of the hydraulic pump into the second fluid chamber of the steering control cylinder while permitting a pressurized fluid in the first fluid chamber thereof to flow out into the reservoir.

7 Claims, 14 Drawing Sheets

DIRECTIONAL CONTROL VALVE IN A FULL HYDRAULIC TYPE STEERING CONTROL SYSTEM

TECHNICAL FIELD

The present invention relates to a directional control valve for delivering a pressurized discharge fluid of a hydraulic pump into a steering control cylinder in a full hydraulic type steering control system.

BACKGROUND ART

A full hydraulic type steering control system known in the prior art is shown in FIG. 1 of the accompanying drawings.

More specifically, in the prior art full hydraulic type steering control system is provided with a directional control valve 3 for selectively delivering a pressurized discharge fluid of a hydraulic pump 1 into the respective fluid chambers 2a and 2b of a pair of steering control cylinders 2, a steering control valve 6 for selectively delivering the pressurized discharge fluid of the above-mentioned hydraulic pump 1 into first and second pressure receiving portions 4 and 5 of the directional control valve 3 to switch over the directional control valve 3, a steering wheel 7 for switching the above-mentioned steering control valve 6, a combining valve 8 for combining the pressurized discharge fluid of the hydraulic pump 1 and a pressurized fluid from the steering control valve 6 together for delivery into the directional control valve 3, and an opening and closing valve 9.

In the above-mentioned full hydraulic type steering control system, steering the steering wheel 7 will cause the pressurized discharge fluid of the hydraulic pump 1 to be delivered into a first port 11 or a second port 12 of the steering control valve 6 and the pressurized fluid to be delivered into the first or second pressure receiving portion 4 or 5 of the directional control valve 3 to switch the directional control valve 3 from its neutral position A to its first position B or to its second position C. This will, in turn, cause the combining valve 8 to be switched from its blocking position D to its communicating position E, and further the opening and closing valve 9 to be switched from its closing position F to its opening position G. The pressurized discharge fluid of the above-mentioned hydraulic pump 1 will thus flow via the combining valve 8 and the opening and closing valve 9 again into the combining valve 8 for merging with the pressurized fluid delivered from the steering control valve 6 and will then be delivered via the directional control valve 3 into the respective fluid chambers 2a or 2b of the two steering control cylinders 2. A pressurized fluid in each of the fluid chambers 2b and 2a will be allowed to flow via the directional control valve 3 and a drain passage 13 into a reservoir. The steering control cylinder 2 will thus be expandingly or contractively operated to steer the vehicle wheels (not shown) leftward or rightward. If the steering wheel 7 is halted at an optional position thereafter, the steering control valve 6 will be rendered incapable of outputting the pressurized fluid, thus restoring the directional control valve 3 to its neutral position A under the action of a pair of springs 14. As a result, the pressurized fluid 3 will no longer flow into the steering control cylinder 2, thereby keeping a pressure as it is within the fluid chamber 2a or 2b of the steering control cylinder 2.

The above being the case, the steering control cylinders 2 will be expandingly or contractively operated with their stroke length being proportional to an amount of steering at the steering wheel 7 to determine the angle of steering. It will also enable a flow of fluid that is greater than a flow of fluid delivered from the steering valve 6 to be delivered into the steering cylinders 2. More specifically, being called the Orbit Roll (trade name), the steering valve 6 is a valve having a metering function for outputting a flow of fluid that is commensurate with an amount of steering at the steering wheel 7. Since the steering control valve 6 is configured structurally so as to be unable to output a large flow of fluid, its output pressurized fluid is designed to be converted to establish a pilot pressure fluid such that the directional control valve 3 may be switched so as to be capable of delivering a large flow of fluid that is a given multiplying proportion of the output pressurized fluid of the steering control valve 6 into the steering control cylinders 2. In this case, a flow rate augmenting valve mechanism is implemented with the directional control valve 3, the merging valve 8 and the opening and closing valve 9 which are combined together.

In the construction of FIG. 1, note also that a valve 15 that is provided in the discharge passage 1a of the hydraulic pump 1 is designed to deliver the pressurized discharge fluid of the hydraulic pump 1 to an additional hydraulic circuit 14 when any steering operation is not carried out.

In a state in which the steering cylinders 2 are expandingly or contractively operated in a manner as mentioned previously to steer the vehicle leftward or rightward, it can be seen that a pressure will be generated in the fluid chambers 2a or 2b of the steering control cylinders 2. When the steering wheel 7 is turned in the opposite direction from this state (by the way, this operation is commonly referred to as the wheel switchover), it should be apparent that the directional control valve 3 will be switched to the first or the second position B or C to establish a communication of the fluid chambers 2a or 2b in which the pressure is generated of the steering control cylinders 2 with the drain passage 13. Thus, a rapid pressure drop will be generated in each of these fluid chambers, in which it has been found that a mechanical vibration is also generated and, coupled with a repulsive force by the steered vehicle wheels themselves, causes a mechanical vibration of the directional control valve 3 itself, which will be felt by the operator as a shock since the steered wheels are not run smoothly.

This phenomenon has hitherto been developed with a greater markedness in case the steered wheels are largely steered in a state in which the vehicle is stopped.

With respect to this problem, an explanation will be given in greater detail below.

More specifically, as shown in FIG. 2 of the accompanying drawings, the directional control valve 3 is so constructed that a spool 22 may be slidably inserted in a spool bore 21 of a valve body 20, the spool bore 21 may be formed with a main inlet port 23, a first actuator port 24, a second actuator port 25, a first reservoir port 26, a second reservoir port 27, a first pilot pressure detecting port 28, a second pilot pressure detecting port 29, a first pilot pressure introducing port 30 and a second pilot pressure introducing port 31. The main inlet port 23 may communicate via the combining valve 8 with the hydraulic pump 1, the first and second actuator ports 24 and 25 may communicate with the fluid chambers 2a and 2b of the steering control cylinders 2, the first and second reservoir ports 26 and 27 may communicate with the drain passage 13, the first and the second pilot pressure detecting ports 28 and 29 may communicate with the combining valve 8, and the first and the second pilot pressure introducing ports 30 and 31 may communicate with the first and second pressure receiving portions 4 and 5, respectively and with the first and the second ports 11 and 12 of the steering control valve 6, respectively.

The spool 22 may be held at its neutral position for blocking each port as mentioned above with a spring 14 at its left hand side and a spring 14 at its right hand side and may be slidingly displaced leftward or rightward to take its first position or its second position when a pilot pressure is applied to the first or the second pilot pressure introducing port 30 or 31. A communication and blocking between the first actuator port 24 and the first reservoir port 26 may be established with a notch 32 and a small diameter portion 33 or a large diameter portion of the spool 22, respectively. A communication and blocking between the second actuator port 25 and the second reservoir port 27 may also be established with the notch 32 and the small diameter portion 33 or the large diameter portion of the spool 22.

The above being the case, the areas of respective apertures in combination of the first and second actuator ports 24, 25 and of the first and second reservoir ports 26, 27 will be determined by the notch 32 in an initial period of displacement of the spool 22 and by the small diameter portion 33 as the spool 22 is further displaced. Accordingly, there is determined the area of an aperture with respect to the position of displacement of the spool 22 as shown by the solid line A in the graph of FIG. 3 of the accompanying drawings.

As the spool 22 is displaced, the areas of the respective apertures in combination of the first and second actuator ports 24, 25 and the first and second reservoir ports 26, 27 will be rapidly increased. Accordingly, it should be apparent that coupled with a repulsive force of the steered wheels themselves, the pressure within each of the steering control cylinders 2 would be sharply decreased, and that since the spool 22 is mechanically vibrated under the action of the springs 14, the areas of the respective apertures in combination of the first and second actuator ports 24, 25 and the first and second reservoir ports 26, 27 would undergo a repetition of the rapid increase and decrease. Hence, there does result a large fluctuation in the pressure in each of the steering control cylinders 2. This will be felt as a shock by the operator.

Accordingly, it is an object of the present invention to provide a directional control valve in a full hydraulic type steering control system whereby the shock that would be felt by the operator can largely be reduced.

SUMMARY OF THE INVENTION

In order to attain the object mentioned above, there is provided in accordance with the present invention, a directional control valve in a full hydraulic type steering control system in which there are provided a steering control valve for outputting a flow of a pressurized discharge fluid of a hydraulic pump in a proportion to an amount of steering at a steering wheel, and the directional control valve being switched for delivering the pressurized discharge fluid of the hydraulic pump into a steering control cylinder with the output flow of pressurized fluid of the steering control valve as a pilot fluid pressure, and in which the directional control valve comprises a spool adapted to be slidably inserted in a spool bore of a valve body, the spool having a neutral position and being adapted to be displaceable from the neutral position towards a first position for delivering the pressurized discharge fluid of the hydraulic pump into a first fluid chamber of the steering control cylinder while permitting a pressurized fluid in a second fluid chamber thereof to flow out into a reservoir and towards a second position for delivering the pressurized discharge fluid of the hydraulic pump into the second fluid chamber of the steering control cylinder while permitting a pressurized fluid in the first fluid chamber thereof to flow out into the reservoir, the said directional control valve being characterized in that the spool is formed with a small diameter portion and a notched groove portion for allowing a fluid to flow out of the steering control cylinder into the reservoir, the notched groove portion being configured to have an aperture whose area is adapted to be increased as the spool is displaced from the neutral position towards the first or the second position up to an intermediate position towards the position and thereafter towards the latter to be decreased.

According to the construction mentioned above, where the pressurized fluid of the steering control cylinder is allowed to flow via the notched groove portion and the small diameter portion into the said reservoir when the spool is displaced from its neutral position towards its first position or its second position, by virtue of the fact that the area of the aperture of the notched groove portion is adapted to be increased as the spool is displaced up to an intermediate position towards the position and thereafter towards the latter to be decreased, there will be no sudden flow of the pressurized fluid out of the steering control cylinder into the said reservoir. As a result, there will be no large fluctuation in the pressure of the steering control cylinder, and there will be no appreciable mechanical vibration of the spool whereby any shock that would be felt by the operator can be diminished.

Here, it should be noted that the notched groove portion may comprise a first notched groove which is configured to be open to the small diameter portion, and a second notched groove which is configured not to be open to the small diameter portion.

Also, in addition to the above-mentioned construction, it should be noted that the valve body may be formed with an actuator port for communication with one of the first and second fluid chambers, and a reservoir port for communication with the reservoir; that the small diameter portion may be configured to be constantly open to the reservoir port and not to be open to the actuator port; that the first notched groove may be configured to be open to the small diameter portion and to be open and closed to the actuator port; and that the second notched groove may be configured not to be open to the small diameter portion and to be open and closed to the actuator port and the reservoir port.

Further, it should be noted that the first notched groove may be configured to be broad in width at a side proximal to the small diameter portion and gradually narrowed in width at a side distal to the small diameter portion; and that the second notched groove may be configured to be continuously broad in width and rectangular in a longitudinal direction.

It should also be noted that the notched groove portion may comprise a first side notched groove and a second side notched groove, both of which are configured to be open to the small diameter portion.

In addition to the construction mentioned above, it should also be noted that the valve body may be formed with an actuator port for communication with one of the first and second fluid chambers, and a reservoir port for communication with the reservoir; that the small diameter portion may be configured to be switchably open and closed to the actuator port and the said reservoir port; that the said first side notched groove may be configured to be open to the small diameter portion and to be open and closed to the reservoir port; and that the second side notched groove may be configured to be open to the small diameter portion and to be open to the actuator port.

Further, it should be noted that the first side notched groove may be configured to be broad in width at a side proximal to the small diameter portion and to be shallow and short and gradually narrowed in width at a side distal to the small diameter portion; and that the second side notched groove may be configured to be deep and long and continuously rectangular in a longitudinal direction.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings.

BEST MODES FOR CARRYING OUT THE INVENTION

Figure 1:
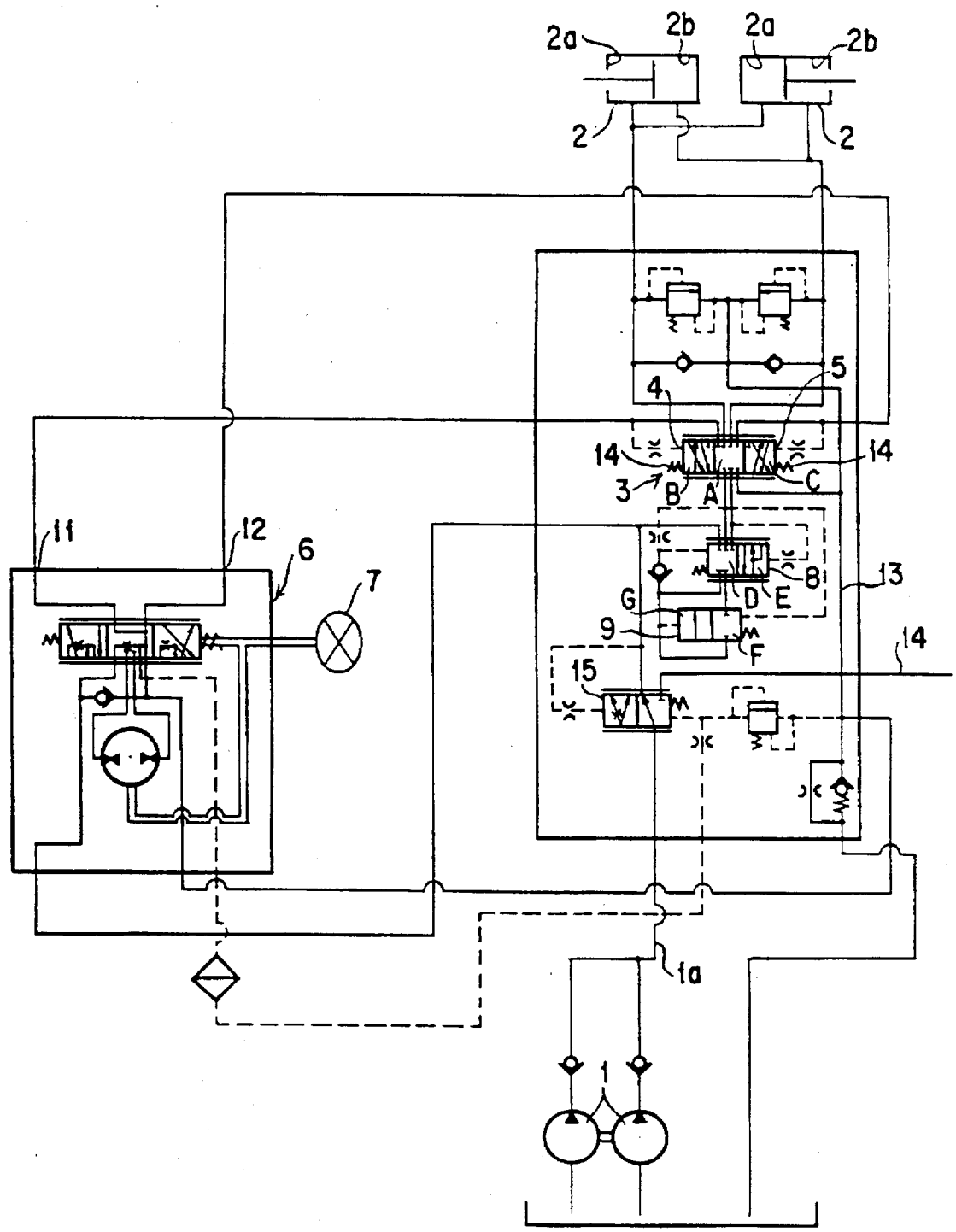
FIG. 1 is a diagrammatic view illustrating a full hydraulic type steering control system.
Figure 2:
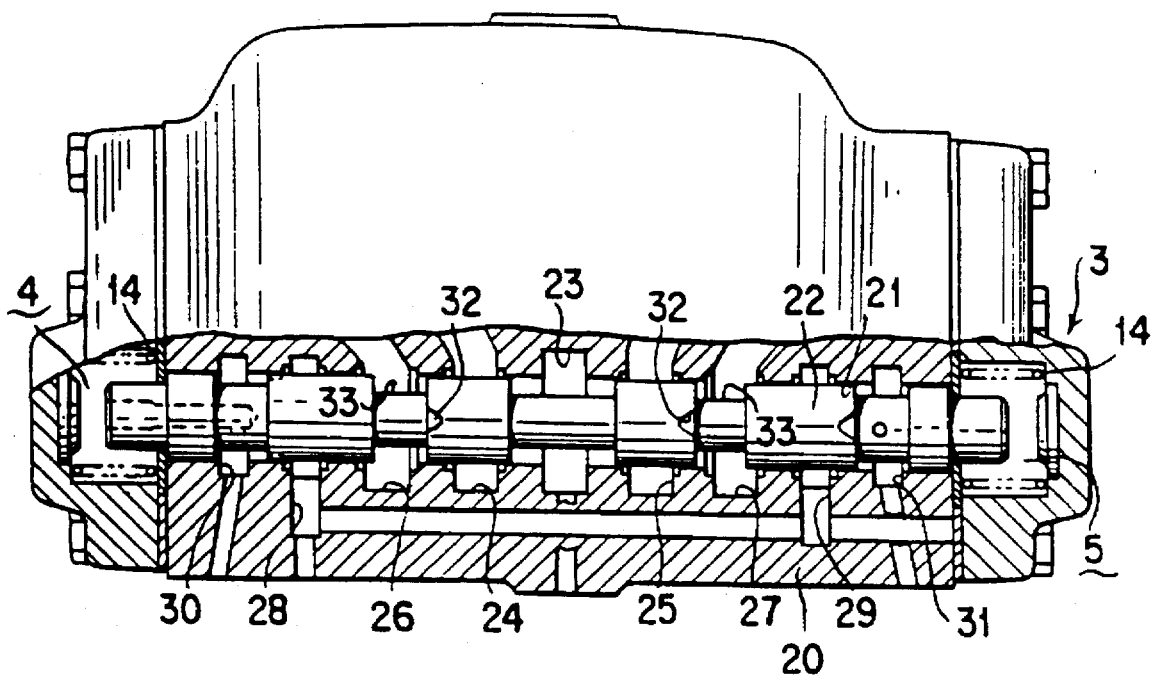
FIG. 2 is a front view, partly cut away, illustrating a portion of the conventional directional control valve.

Hereinafter, suitable embodiments of the present invention with respect to the directional control valve in a full hydraulic steering control system will be set forth with reference to the accompanying drawings.

FIGS. 4 to 13 show a first embodiment of the directional control valve according to a first embodiment of the present invention. In these FIGS. 4 to 13, the same reference numerals as used hereinbefore in connection with the description of the conventional system are used to designate identical members or parts.

Figure 4:
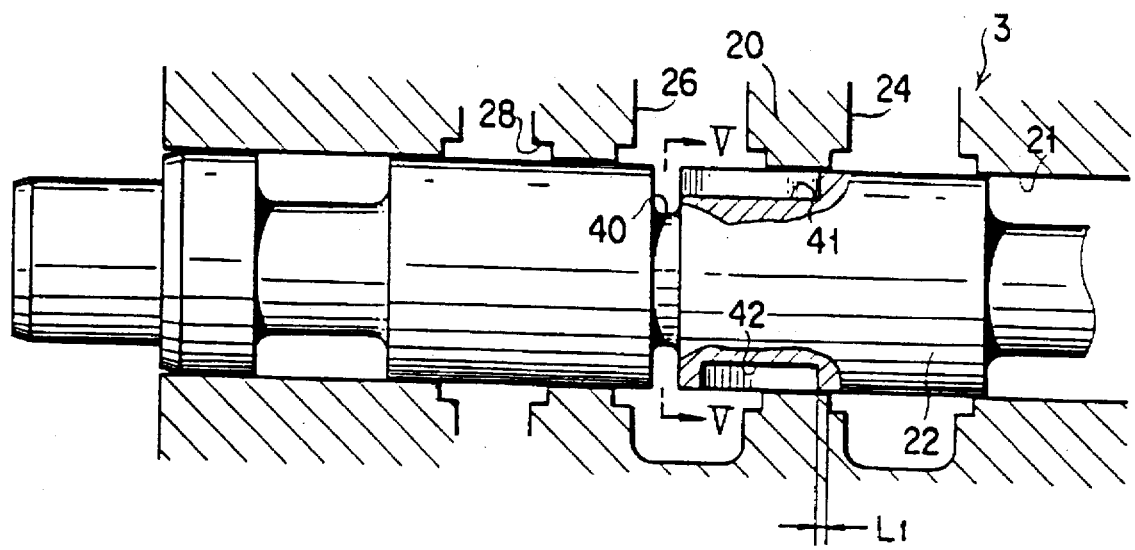
FIG. 4 is a cross sectional view, partly cut away, illustrating the directional control valve according to a first embodiment of the present invention.
Figure 5:
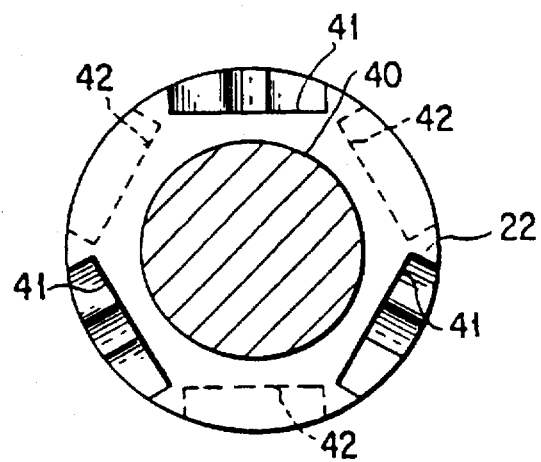
FIG. 5 is a cross sectional view taken along the line V—V in FIG. 4.

As can be seen from FIGS. 4 and 5, in order to establish a communication between a first actuator port 24 and a first reservoir port 26, a spool 22 is formed with a small diameter portion 40 that is open at all times to the first reservoir port 26, a first notched groove 41 that is open to the small diameter portion 40, and a second notched groove 42 that is not open to the small diameter portion 40. In this connection, it should be noted that the first actuator port 24 and the first reservoir port 26 are blocked with a large diameter portion of the spool 22.

Figure 6:
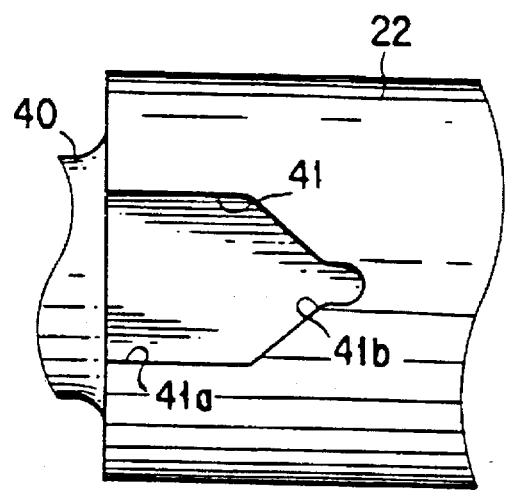
FIG. 6 is a top plan view illustrating a first notched groove in the above-mentioned first embodiment of the present invention.
Figure 7:
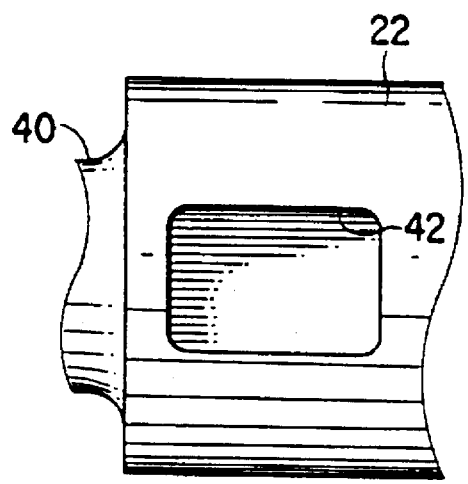
FIG. 7 is a top plan view illustrating a second notched groove in the above-mentioned first embodiment of the present invention.

As can be seen from FIG. 6, the above mentioned first notched groove 41 is shaped to be large in width at its side 41a of the small diameter portion 40 and to be gradually narrowed in width at its side 41b that is opposite to the small diameter portion 40. When the spool 22 is at its neutral position, the first notched groove 41, as shown in FIG. 4, will not be open to the first actuator port 24 but open to the first reservoir port 26. The above-mentioned second notched groove 42, as seen from FIG. 7, is shaped to be rectangular in its configuration and large in width and continuous in the longitudinal direction. When the spool 22 is at its neutral position, the second notched groove 42, as shown in FIG. 4, will not be open to the first actuator port 24 but open to the reservoir port 26.

Figure 8:
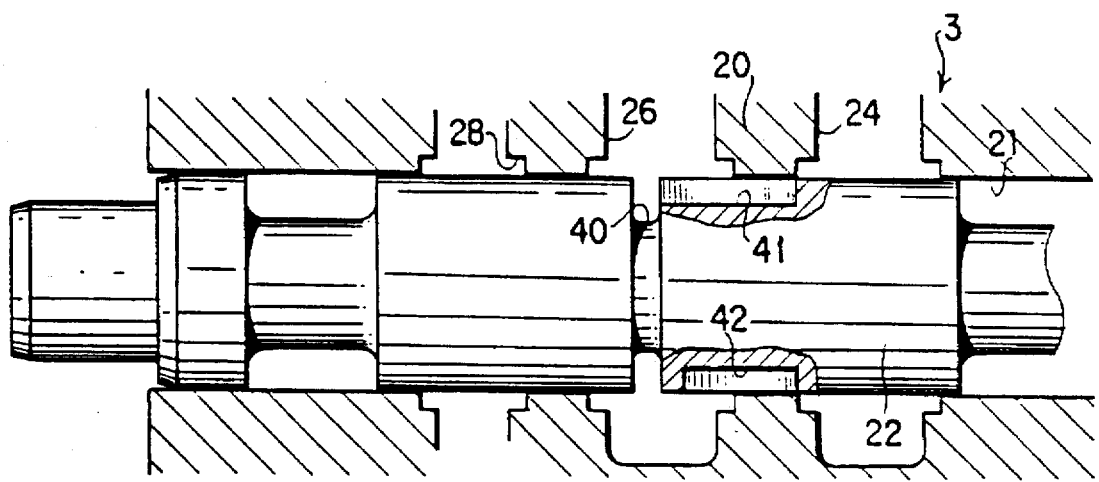
FIGS. 8 through 12 are diagrammatic views illustrating operations of the spool in its various stages where it is displaced rightward in the above mentioned first embodiment of the present invention.
Figure 9:
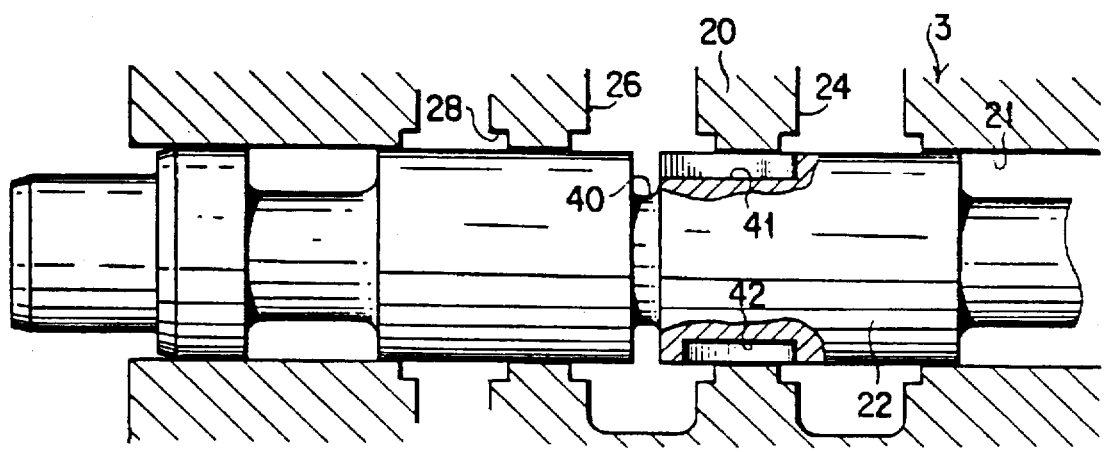
Figure 10:
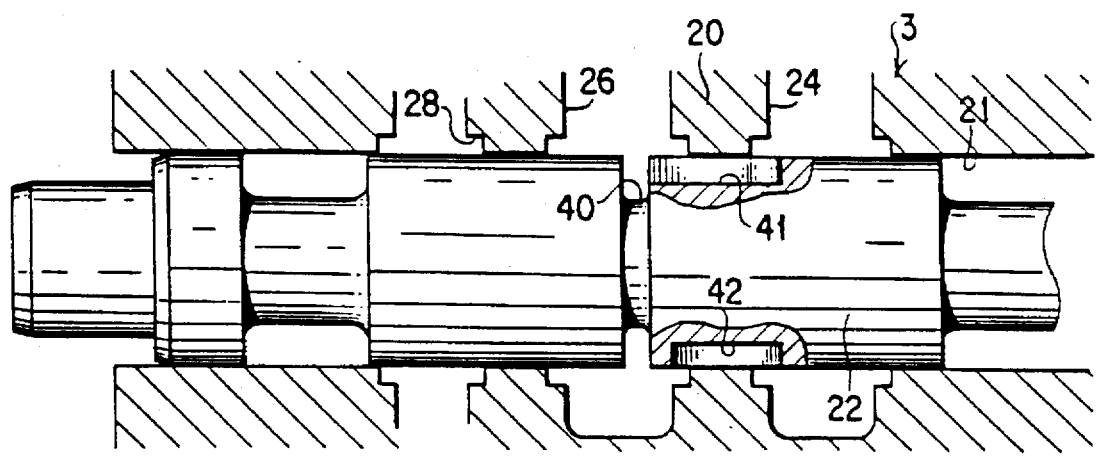
Figure 11:
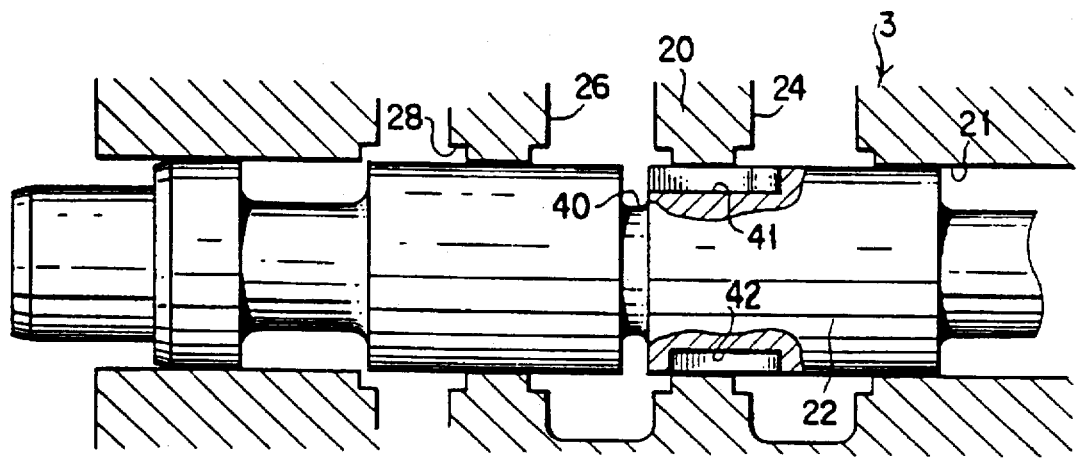
Figure 12:
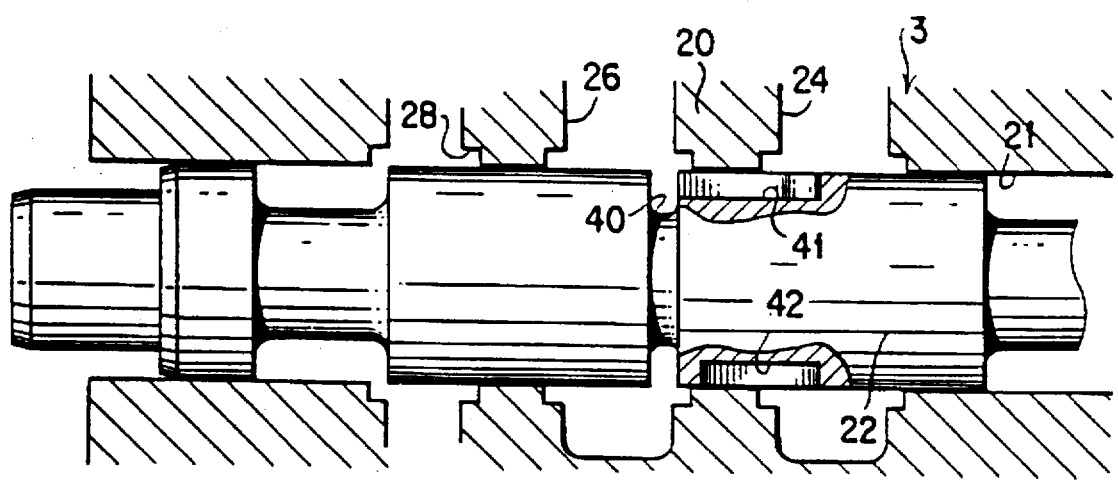
Figure 13:
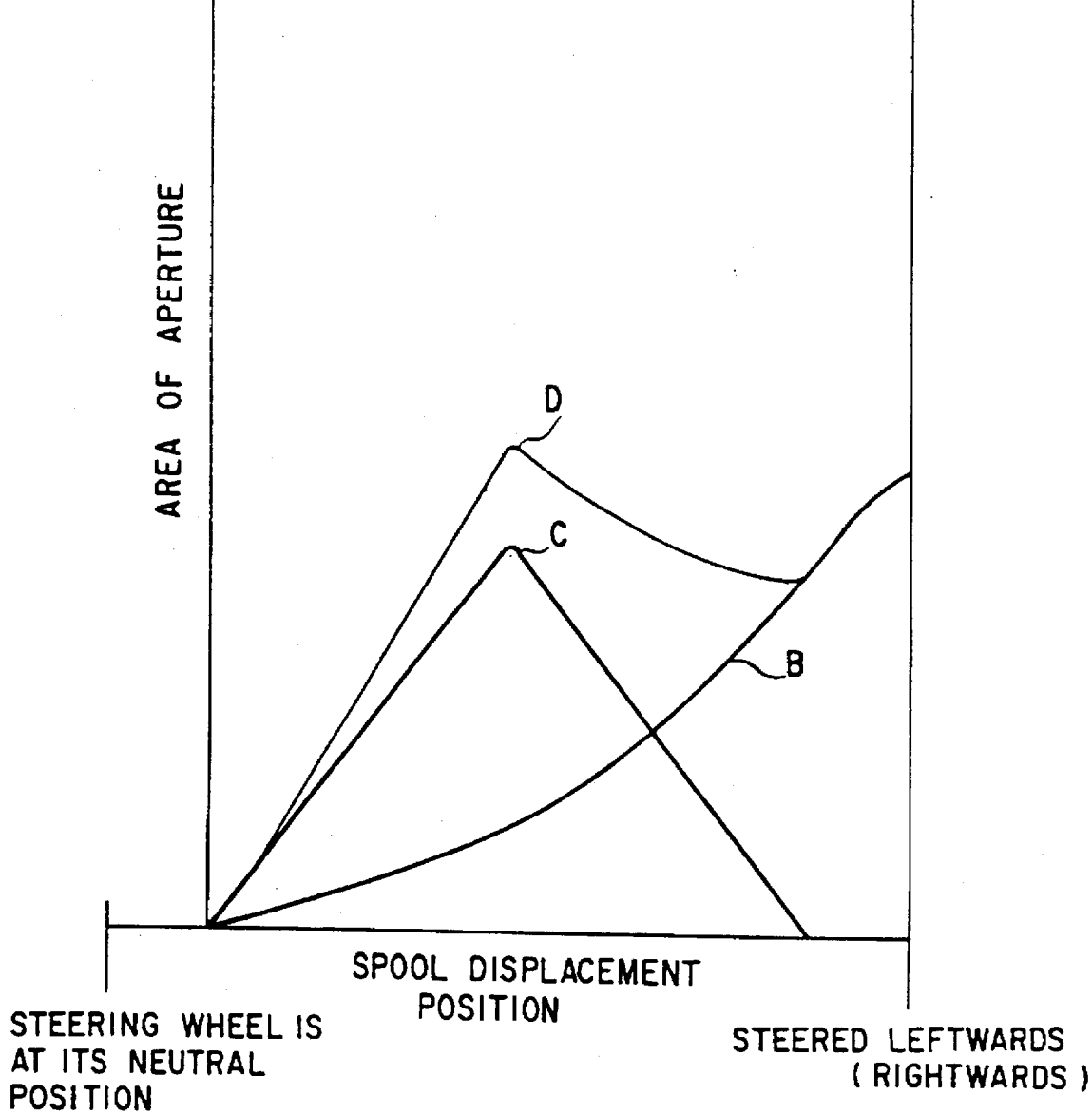
FIG. 13 is a graph diagrammatically illustrating the relationship between the areas of the apertures of the first and second notched grooves and the spool displacement position.

The above being the case, when the spool 22 is at its neutral position, as shown in FIG. 4, a communication between the actuator port 24 and the first reservoir port 26 will be blocked with the large diameter portion of the spool 22. When the spool 22 from this state is displaced rightward by a distance $L_1$ as shown in FIG. 8, the first and second notched grooves 41 and 42 will commence opening to the first actuator port 24. When the spool 22 is further displaced rightwards as shown in FIGS. 9 to 12, the area of the combined aperture of the first and second notched grooves 41 and 42 and the first actuator port 24 will progressively be increased.

In this case, since the first notched groove 41 is open to the small diameter portion 40, the area (minimum value) of the combined aperture of the first reservoir port 26 and the first notched groove 41 will be determined by the cross sectional area of the first notched groove 41 as shown in FIG. 5. This will be constant without regard to any displacement position of the spool 22. Also, since the area of the combined aperture of the first actuator port 24 and the first notched groove 41 is smaller than the area of the combined aperture of the first reservoir port 28 and the first recessed groove 41, the area (minimum value) of the combined opening of the first actuator port 24 and the first reservoir port 26 via the first notched groove 41 will be determined by the area of the combined aperture of the first actuator port 24 and the first notched groove 41. It will progressively be enlarged proportionally to the displacement of the spool 22 as shown by the solid line B in the graph of FIG. 13.

Noting the fact that the second notched groove 42 is not open to the small diameter portion 40 directly, it is seen that the area (the minimum value) of the combined opening via the second notched groove 42 of the first actuator port 24 and the first reservoir port 26 if the second notched groove 42 commences opening to the first actuator port 24 as shown in FIG. 8 will initially be determined by the area of the combined aperture of the first actuator port 24 and the second notched groove 42. And, it will be increased until the area of the combined aperture of the first actuator port 24 and the second notched groove 42 becomes equal to the area of the combined aperture of the first reservoir port 26 and the second notched groove 42 as the spool 22 is displaced as shown by the solid line C in the graph of FIG. 13. And, thereafter, the area of the combined opening via the second notched groove 42 of the first actuator port 24 and the first reservoir port 26 will be determined by the combined opening of the first reservoir port 26 and the second notched groove 42, will be gradually reduced as the spool 22 is displaced and finally will become zero immediately before the spool 22 reaches its maximum displacement position.

It can thus been seen that the area of the combined opening of the first actuator port 24 and the first reservoir port 28 via the first notched groove 41 and the second notched groove 42 will, as shown by the solid line D that represents a sum of the solid lines B and C, be progressively increased until the spool 22 reaches an intermediate displacement position here rightwards. And, thereafter it will be reduced and, after the spool 22 reaches a position slightly ahead of the maximum displacement position there will only remain the area of the aperture of the first notched groove 41. Consequently, compared with the area of the aperture in the conventional directional control valve as shown by the curve A, the area of the aperture according to the present invention follows a curve as shown by the solid line E in the graph of FIG. 3 (which corresponds to the solid line D in the graph in FIG. 13).

As set forth in the foregoing, according to this embodiment of the present invention, while the pressurized fluid in the steering control cylinder 2 is allowed to flow out via the first and second notched grooves 41 and 42 and the small diameter portion 40 into the reservoir when the spool 22 is displaced from its neutral position towards the first position or the second position, owing to the fact that the area of the aperture of the above-mentioned notched grooves will be increased until the spool 22 is displaced to the above-mentioned intermediate position and thereafter will be reduced, there should be no sudden flowing of the pressure fluid out of the steering control cylinders 2 into the reservoir. As a consequence, since there should be no large fluctuation in the pressure within the steering cylinders 2 and there should be no appreciable mechanical vibration of the spool 22 either, the shock that would be felt by the operator should be diminished.

Figure 14:
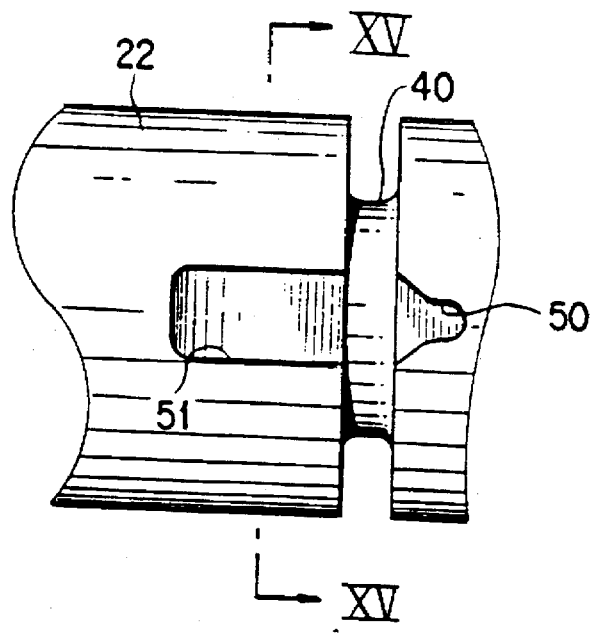
FIG. 14 is a a top plan view illustrating a pair of notched grooves in the directional control valve according to a second embodiment of the present invention.
Figure 15:
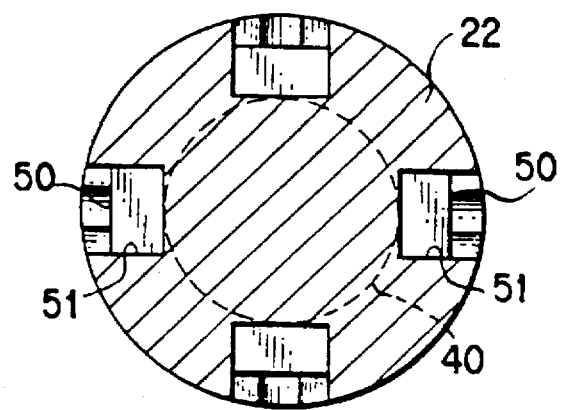
FIG. 15 is a cross sectional view taken along the line XV—XV in FIG. 14.

FIGS. 14 to 22 show a directional control valve according to the second embodiment of the present invention. At a first side and a second side of the small diameter portion 40, as shown in FIGS. 14 and 15, the spool 22 is formed with one side notched groove 50 and the other side notched groove 51 both of which are opening to the small diameter portion 40. It is seen that the one side notched groove 50 is shallow, short and V-shaped in its planar configuration whereas the other side notched groove 51 is deep, elongate and rectangular in its planar configuration.

Figure 16:
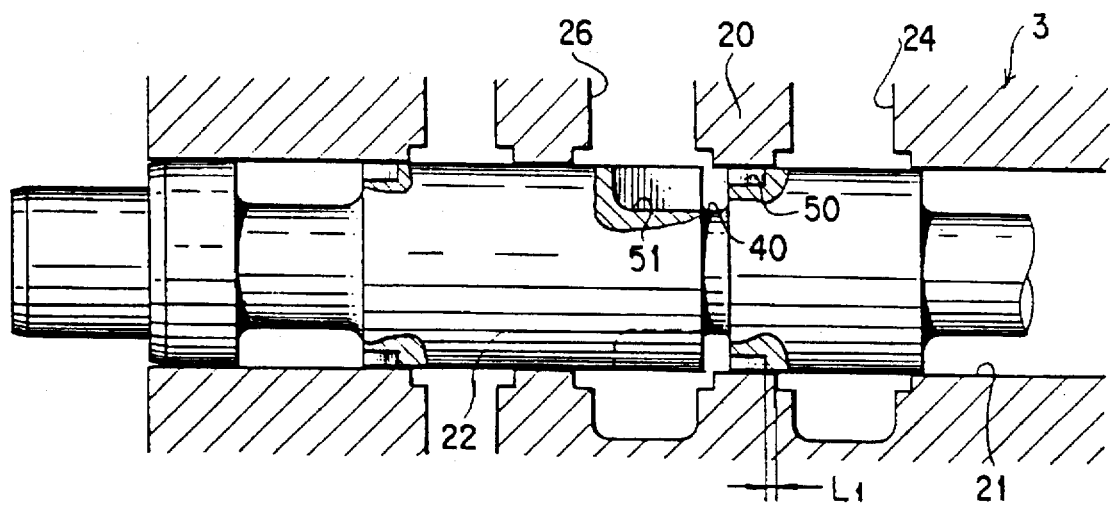
FIGS. 16 through 22 are diagrammatic views illustrating operations of the spool in its various stages where it is displaced rightwards in the above-mentioned second embodiment of the present invention.
Figure 17:
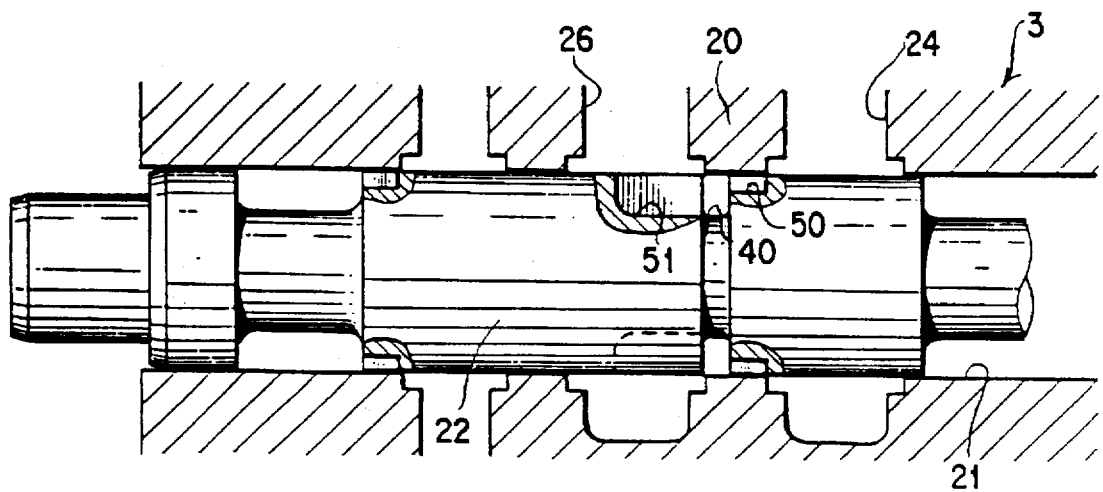
Figure 18:
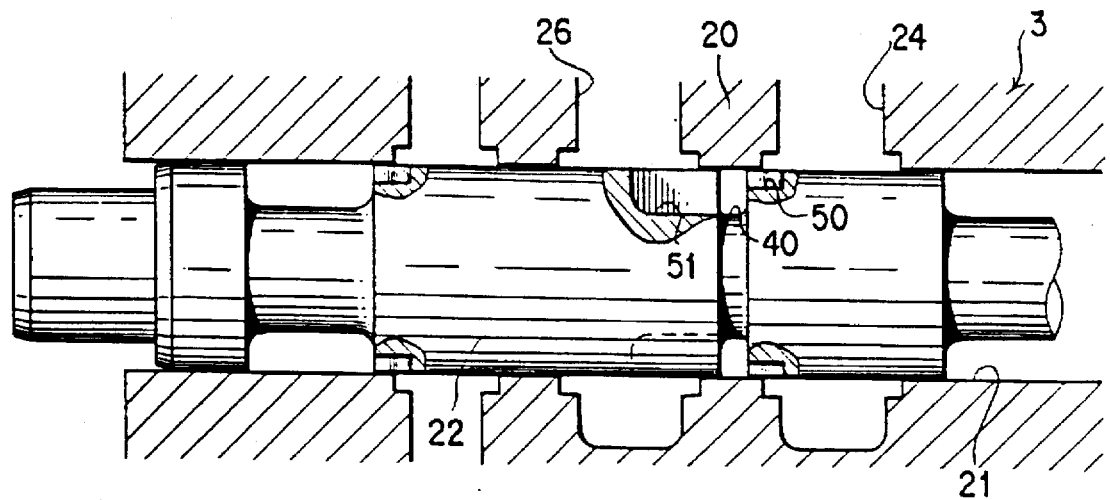
Figure 19:
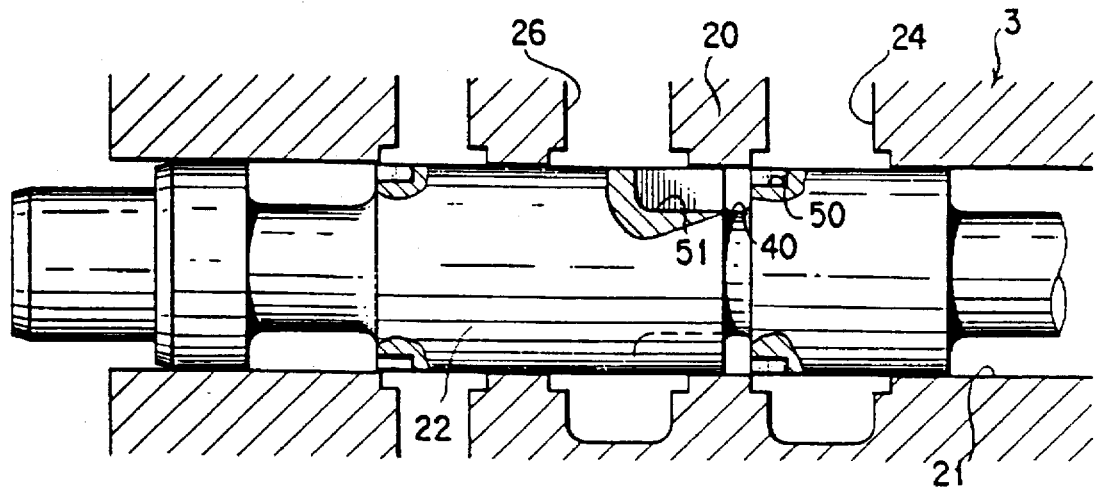

When the spool 22 is at its neutral position, it is thus seen that, as shown in FIG. 16, a communication between the first actuator port 24 and the first reservoir port 26 is blocked with the large diameter portion of the spool 22, and when the spool 21 from this state is displaced rightwards by a distance $L_1$ as shown in FIG. 17, the one side notched groove 50 will be made to be open to the first actuator port 24, thus causing the pressurized fluid in the first actuator port 24 to flow via the first side notched groove 50 into the first reservoir port 26. As the spool 22 is further displaced rightward as shown in FIGS. 18 and 19, the area of the combined opening via the one side notched groove 50 will be increased progressively, thus progressively increasing the flow of the pressurized fluid that flows from the first actuator port 24 into the first reservoir port 26.

The second side notched groove 51 will have its opening area with the first reservoir 26 reduced as the spool 21 is displaced rightwards. However with the second side notched groove 51 being deep and elongate, it is greater in cross section than the one side notched groove 50. Since the opening area with the one side notched groove 50 is smaller than the opening area with the other side notched groove 51, as the opening area with the one side notched groove 50 is made larger and larger by displacing the spool 22 continuingly rightward, it follows that the progressively augmented flow will flow into the first reservoir port 26.

Figure 20:
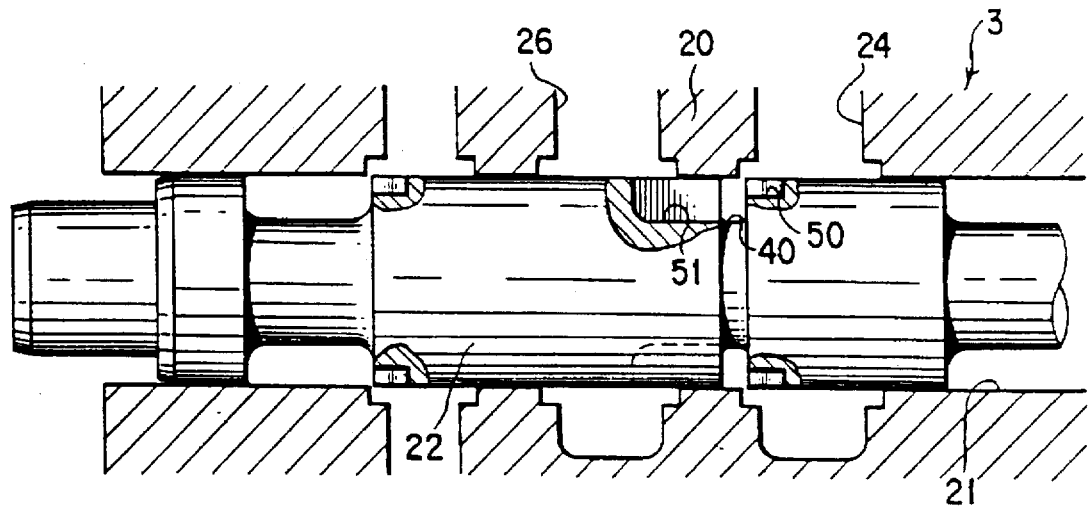

As the spool 21 is further displaced rightward as shown in FIG. 20, owing to the fact that the small diameter portion 40 is made to be open directly to the first actuator port 24, a still further increased flow will flow into the first reservoir port 26.

Figure 21:
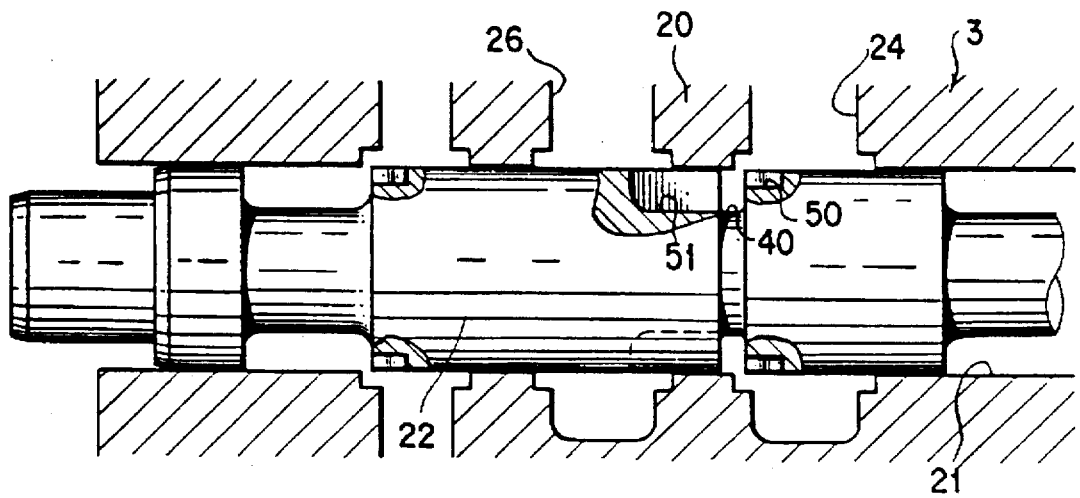
Figure 22:
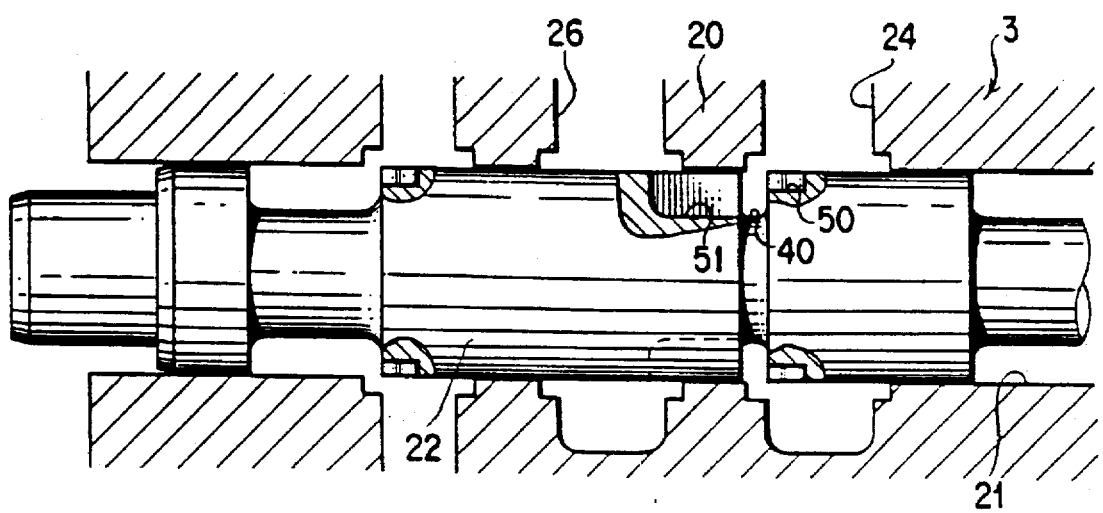

When the spool 22 in the above-mentioned state is still further displaced rightwards as shown in FIGS. 21 and 22, owing to the fact that the opening area of the other side notched groove 51 to the reservoir port 26 is gradually reduced in this instance, the flow that is led from the first actuator port 24 into the first reservoir port 26 will gradually be reduced.

Figure 3:
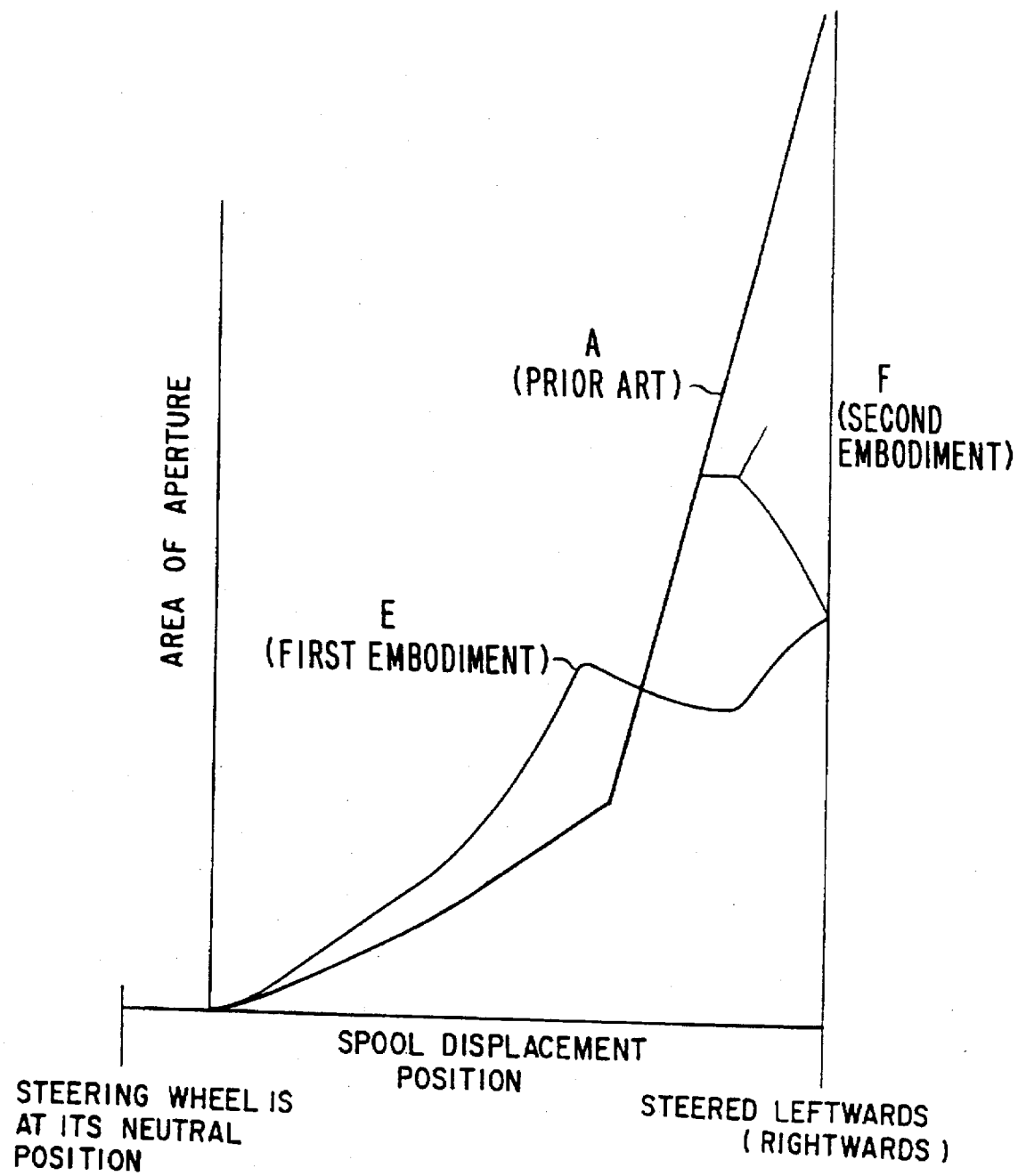
FIG. 3 is a graph diagrammatically illustrating the relationship between the spool displacement position and the area of the aperture of a notched groove portion in a directional control valve.

By this way, it is seen that the area of aperture or opening between the first actuator 24 and the first reservoir port 26 with respect to the displacement position of the spool 22 will follow the curve shown by the solid line F in the graph of FIG. 3.

As set forth in the preceding paragraphs, according to this embodiment of the present invention, where the pressurized fluid of the steering cylinder 2 is allowed to flow via the first side notched groove 50, the small diameter portion 40 and the second side notched groove 51 into the reservoir when the spool 22 is displaced from its neutral position towards its first position or its second position, by virtue of the fact that the area of the aperture of the notched groove portion is adapted to be increased as the spool 22 is displaced up to an intermediate position towards the above mentioned position and thereafter towards the latter to be decreased, here again, there will be no large fluctuation in the pressure of the steering control cylinder 2 and there will develop no appreciable mechanical vibration of the spool 22 whereby any shock that would be felt by the operator can be diminished.

While the present invention has hereinbefore been described with respect to certain illustrative embodiments thereof, it will be readily appreciated by a person skilled in the art that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A full hydraulic type steering control system in which there are provided:

a steering control valve for outputting a flow of a pressurized discharge fluid of a hydraulic pump in a proportion to an amount of steering at a steering wheel, and a directional control valve being switched for delivering the pressurized discharge fluid of the hydraulic pump into a steering control cylinder with the output flow of pressurized fluid of the steering control valve as a pilot fluid pressure, and in which said directional control valve comprises a spool adapted to be slidably inserted in a spool bore of a valve body, said spool having a neutral position and being adapted to be displaceable from said neutral position towards a first position for delivering the pressurized discharge fluid of said hydraulic pump into a first fluid chamber of said steering control cylinder while permitting a pressurized fluid in a second fluid chamber thereof to flow out into a reservoir and towards a second position for delivering the pressurized discharge fluid of said hydraulic pump into said second fluid chamber of said steering control cylinder while permitting a pressurized fluid in said first fluid chamber thereof to flow out into the reservoir, wherein said spool is formed with a small diameter portion and a notched groove portion for allowing a fluid to flow out of said steering control cylinder into the reservoir, said notched groove portion being configured to have an aperture whose area is adapted to be increased as said spool is displaced from said neutral position towards said first or said second position up to an intermediate position towards said position and thereafter towards the latter to be decreased.

2. A directional control valve, as set forth in claim 1, wherein said notched groove portion comprises a first notched groove which is configured to be open to said small diameter portion and a second notched groove which is configured not to be open to said small diameter portion.

3. A directional control valve, as set forth in claim 2, wherein said valve body is formed with an actuator port for communication with one of said first and second fluid chambers, and a reservoir port for communication with said reservoir; said small diameter portion is configured to be constantly open to said reservoir port and not to be open to said actuator port; said first notched groove is configured to be open to said small diameter portion and to be switchably open and closed to said actuator port; and said second notched groove is configured not to be open to said small diameter portion and to be switchably open and closed to said actuator port and said reservoir port.

4. A directional control valve, as set forth in claim 2 or claim 3, wherein said first notched groove is configured to be broad in width at a side proximal to said small diameter portion and gradually narrowed in width at a side distal to said small diameter portion; and said second notched groove is configured to be continuously broad in width and rectangular in a longitudinal direction.

5. A directional control valve, as set forth in claim 1, wherein said notched groove portion comprises a first side notched groove and a second side notched groove, both of which are configured to be open to said small diameter portion.

6. A directional control valve, as set forth in claim 5, wherein said valve body is formed with an actuator port for communication with one of said first and second fluid chambers, and a reservoir port for communication with said reservoir; said small diameter portion is configured to be switchably open and closed to said actuator port and said reservoir port; said first side notched groove is configured to be switchably open to said small diameter portion and to be open and closed to said reservoir port; and said second side notched groove is configured to be open to said small diameter portion and to be open to said reservoir port.

7. A directional control valve, as set forth in claim 5 or claim 6, wherein said first side notched groove is configured to be broad in width at a side proximal to said small diameter portion and to be shallow and short and gradually narrowed in width at a side distal to said small diameter portion; and said second side notched groove is configured to be deep and long and continuously rectangular in a longitudinal direction.

* * * * *